US012694285B2

(12) United States Patent
Pfeil et al.

(10) Patent No.: US 12,694,285 B2
(45) Date of Patent: Jul. 28, 2026

(54) METHOD AND APPARATUS FOR TRAINING A QUANTIZED CLASSIFIER

(71) Applicant: Robert Bosch GmbH, Stuttgart (DE)

(72) Inventors: Thomas Pfeil, Kornwestheim (DE); Benedikt Sebastian Staffler, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 1166 days.

(21) Appl. No.: 17/395,533

(22) Filed: Aug. 6, 2021

(65) Prior Publication Data

US 2022/0051096 A1 Feb. 17, 2022

(30) Foreign Application Priority Data

Aug. 13, 2020 (DE) ..................... 10 2020 210 328.3

(51) Int. Cl.
*G06N 3/08* (2023.01)
*G06F 18/2413* (2023.01)
*G06F 18/2431* (2023.01)

(52) U.S. Cl.
CPC ........... *G06N 3/08* (2013.01); *G06F 18/2413* (2023.01); *G06F 18/2431* (2023.01)

(58) Field of Classification Search
CPC .... G06N 3/08; G06F 18/2413; G06F 18/2431
See application file for complete search history.

(56) References Cited

U.S. PATENT DOCUMENTS

| | | | | |
|---|---|---|---|---|
| 9,208,323 | B1 | 12/2015 | Karta et al. | |
| 11,803,734 | B2 * | 10/2023 | Lowell | G06N 3/08 |

| | | | | |
|---|---|---|---|---|
| 11,995,555 | B1 * | 5/2024 | Drimbarean | G06N 3/084 |
| 12,093,816 | B1 * | 9/2024 | Drimbarean | G06N 3/084 |
| 2016/0086078 | A1 * | 3/2016 | Ji | G06V 30/19173 |
| | | | | 382/157 |
| 2017/0270408 | A1 * | 9/2017 | Shi | G06N 3/063 |
| 2018/0107925 | A1 * | 4/2018 | Choi | G06N 3/063 |
| 2018/0253401 | A1 * | 9/2018 | Cardinaux | G06N 3/08 |

(Continued)

FOREIGN PATENT DOCUMENTS

| | | |
|---|---|---|
| CN | 103020711 A | 4/2013 |
| CN | 109344893 A | 2/2019 |

(Continued)

OTHER PUBLICATIONS

Yuhang Li, etc., "RTN: Reparameterized Ternary Network", published Dec. 12, 2019 to arXiv, retrieved Nov. 24, 2024. (Year: 2019).*

(Continued)

*Primary Examiner* — Shourjo Dasgupta
(74) *Attorney, Agent, or Firm* — Maginot, Moore & Beck LLP

(57) ABSTRACT

A computer-implemented method for training a classifier is disclosed. The classifier is designed to determine an output (y) for an input data point (x). The output (y) characterizes a classification of the input data point (x). The classifier comprises a multiplicity of weights on the basis of which the output (y) is determined. At least one weight of the multiplicity of weights is quantized to a predefined first number of first values. Each two consecutive first values differ by a distance value. The distance value is also adjusted for training and the multiplicity of weights is not adjusted.

8 Claims, 9 Drawing Sheets

(56) References Cited

U.S. PATENT DOCUMENTS

| | | | | | |
|---|---|---|---|---|---|
| 2018/0365564 A1* | 12/2018 | Huang | .................... | G06N 3/045 |
| 2019/0042935 A1* | 2/2019 | Deisher | ..................... | G06F 5/01 |
| 2019/0073582 A1 | 3/2019 | Yang et al. | | |
| 2020/0082269 A1* | 3/2020 | Gao | ........................ | G06F 7/483 |
| 2020/0218982 A1 | 7/2020 | Annau et al. | | |
| 2020/0302299 A1* | 9/2020 | Nagel | ....................... | G06N 3/04 |
| 2021/0110273 A1* | 4/2021 | Kwon | ..................... | G06N 99/00 |

FOREIGN PATENT DOCUMENTS

| | | | | | |
|---|---|---|---|---|---|
| CN | 109754063 A | | 5/2019 | | |
| CN | 106796668 B | * | 6/2019 | ............. | G06F 30/39 |
| CN | 110276451 A | * | 9/2019 | | |
| CN | 111126557 A | * | 5/2020 | ............. | G06N 3/045 |
| CN | 111428852 A | * | 7/2020 | ............. | G06N 3/045 |
| DE | 10 2018 220 608 A1 | | 3/2020 | | |
| TW | 201918939 A | * | 5/2019 | ............. | G06N 3/04 |
| TW | 201933193 A | * | 8/2019 | ............. | G06F 17/18 |
| WO | 2020/126373 A1 | | 6/2020 | | |

OTHER PUBLICATIONS

"AIMET Model Quantization", published May 20, 2020 to https://quic.github.io/aimet-pages/AimetDocs/user_guide/model_quantization.html, retrieved Nov. 24, 2024. (Year: 2020).*

Bernard Marr, "10 Amazing Examples of How Deep Learning AI Is Used In Practice?", updated publication as of Dec. 12, 2018, retrieved from https://www.forbes.com/sites/bernardmarr/2018/08/20/10-amazing-examples-of-how-deep-learning-ai-is-used-in-practice on Nov. 25, 2024. (Year: 2018).*

Steven K. Esser, etc., "Learned Step Size Quantization", published to arXiv as of May 7, 2020, retrieved May 25, 2025. (Year: 2020).*

Allicja Kwasniewska, etc., "Deep Learning Optimization for Edge Devices: Analysis of Training Quantization Parameters", published to IECON 2019—45th Annual Conference of the IEEE Industrial Electronics Society,. vol. 1, pp. 96-101, year 2019, retrieved May 25, 2025. (Year: 2019).*

Sanghyun Seo, etc., "Efficient Weights Quantization of Convolutional Neural Networks Using Kernel Density Estimation based Non-uniform Quantizer", published to Applied Sciences as of Jun. 23, 2019, retrieved from https://www.mdpi.com/2076-3417/9/12/2559 on May 25, 2025. (Year: 2019).*

Jiwei Yang, etc., "Quantization Networks", published to arXiv as of Nov. 28, 2019, retrieved May 25, 2025. (Year: 2019).*

Hsin-Pai Cheng, etc., "Differentiable Fine-grained Quantization for Deep Neural Network Compression", published as of Nov. 13, 2018 to arXiv, retrieved May 25, 20225. (Year: 2018).*

MathWorks, "What is Quantization?", published Jan. 5, 2020 to https://www.mathworks.com/discovery/quantization.html, retrieved May 25, 2025. (Year: 2020).*

Junhao Xu, etc., "Low-bit Quantization of Recurrent Neural Network Language Models Using Alternating Direction Methods of Multipliers", publ. via ICASSP 2020—2020 IEEE International Conference on Acoustics, Speech and Signal Processing, pp. 7939-7943, conference dates May 4-May 8, 2020, retrieved May 25, 2025 (Year: 2020).*

Benoit Jacob, etc., "Quantization and Training of Neural Networks for Efficient Integer-Arithmetic-Only Inference", published as of Dec. 15, 2017, retrieved May 25, 2025. (Year: 2017).*

Fabien Cardinaux, etc., "Iteratively Training Look-Up Tables for Network Quantization", published as to Nov. 13, 2018 to arXiv, retrieved May 25, 2025. (Year: 2018).*

Penghang Yin, etc., "Quantization and Training of Low Bit-Width Convolutional Neural Networks for Object Detection", published as of Aug. 17, 2017 to arXiv, retrieved May 25, 2025. (Year: 2017).*

Yury Nahshan, etc., "Loss Aware Post-training Optimization", published on Mar. 16, 2020 to arXiv, retrieved Mar. 11, 2026. (Year: 2020).*

Itay Hubara, etc., "Quantized Neural Networks: Training Neural Networks with Low Precision Weights and Activations", published via Journal of Machine Learning Research 18 (2018) pp. 1-30, retrieved Mar. 11, 2026. (Year: 2018).*

Sanghyun Seo, etc., "Hybrid Approach for Efficient Quantization of Weights in Convolutional Neural Networks", published via 2018 IEEE International Conference on Big Data and Smart Computing, retrieved Mar. 11, 2026. (Year: 2018).*

Ritchie Zhao, etc., "Improving Neural Network Quantization without Retraining using Outlier Channel Splitting", published on Jan. 28, 2019 to arXiv, retrieved Mar. 12, 2026. (Year: 2019).*

Varun Praveen, "Improving INT8 Accuracy Using Quantization Aware Training and the NVIDIA TAO Toolkit", published on Aug. 4, 2020 to https://developer.nvidia.com/blog/improving-int8-accuracy-using-quantization-aware-training-andtao-toolkit, retrieved Mar. 12, 2026. (Year: 2020).*

Quing Jin et al., AdaBits: Neural Network Quantization with Adaptive Bit-Widths,.

Kuan Wang et al., HAQ: Hardware-Aware Automated Quantization with Mixed Precision, 2019 IEEE/CVF Conference on Computer Vision and Pattern Recognition (CVPR), Jun. 2019, pp. 8612-8620, Long Beach, CA.

* cited by examiner

METHOD AND APPARATUS FOR TRAINING A QUANTIZED CLASSIFIER

This application claims priority under 35 U.S.C. § 119 to application no. DE 10 2020 210 328.3, filed on Aug. 13, 2020 in Germany, the disclosure of which is incorporated herein by reference in its entirety.

TECHNICAL FIELD

The disclosure relates to a method for training a quantized classifier, a method for operating the quantized classifier, a method for controlling an actuator or a display device, a computer program, and a machine-readable storage medium.

BACKGROUND

A method for training a classifier based on a quantization is known from the non-pre-published document DE 10 2020 203 998.4.

SUMMARY

Classifiers are widely used, in particular for the classification of image data or audio data. Classifiers typically comprise weights for the classification, which can be adapted to a desired data set in a training procedure in such a way that a desired output is determined when the data set is classified by the classifier. Neural networks in particular are specific implementations of classifiers that make use of this approach.

The use of classifiers typically requires a trade-off between a classification performance of the classifier and the power consumption and/or memory requirements of the classifier. The performance can be understood here as a rate or accuracy with which the classifier determines a desired class for an input data point submitted to the classifier.

Particularly when classifiers are deployed on embedded hardware, the situation typically arises that the classifier is required to have low power consumption and memory requirements. In order to achieve an adequate performance despite this, so-called quantization methods have proved to be particularly suitable. These methods are able to reduce the number of bits needed to calculate the operations of the classifier.

In order to further reduce the energy consumption and/or memory requirements while maintaining the performance, DE 10 2020 203 998.4 discloses a method by which the parameters of a classifier can be quantized to different quantization types, in particular to different numbers of bits, without significantly changing the performance of the classifier.

The advantage of the method having features according to this disclosure is that a classifier can be trained in such a way that the arithmetic operations of the classifier can be quantized to different quantization types and the performance remains adequate. For the training, the classifier can ideally be based on another training procedure preceding the training using a different quantization type, which means that fewer parameters of the classifier need to be adjusted. In comparison to the prior art, the method can thus advantageously train the classifier in a shorter time since fewer parameters of the classifier are changed. Conversely, this means that the classifier can be trained with more data for the same length of time and thus achieve a better performance.

In a first aspect, the disclosure relates to a computer-implemented method for training a classifier, wherein the classifier is designed to determine an output for an input data point, wherein the output characterizes a classification of the input data point and the classifier comprises a multiplicity of weights on the basis of which the output is determined, wherein at least one weight of the multiplicity of weights is quantized to a predefined first number of first values, wherein each two consecutive first values differ by a distance value, and wherein the distance value is also adjusted for training and the multiplicity of weights is not adjusted.

In particular, the classifier can be designed to accept sensor data from a sensor or a multiplicity of sensors as input data.

For example, the classifier can be designed to classify image data. In this case, for example, the classifier can assign at least one class to an image that characterizes the content of the image. In particular, the classification can also be an object detection. In this case, the classification can characterize the presence of objects and their position in the image. Another typical form of classification is semantic segmentation. Here, the pixels of the image are assigned to a class. For example, in an image of a street situation, a pixel can be assigned to one of the classes road, road user or street sign, depending on which object the pixel in the image belongs to.

Alternatively or additionally, the classifier can be designed to classify audio data. For example, the classifier for an audio signal can determine whether the signal contains a specified audio event. For example, the classifier can be used as part of an at least partially autonomous vehicle, the classifier being used to classify audio signals in the environment of the vehicle. The classifier can then determine, for example, whether a siren of an emergency vehicle can be heard in the vicinity of the vehicle and, if so, control the vehicle so that it does not block the path of the emergency vehicle.

Alternatively or additionally, the classifier can be designed to classify sensor signals that are not available in the form of image data or audio data. For example, the classifier can be used as part of a building control system. For example, it is conceivable that the classifier could accept sensor signals from a temperature sensor and a humidity sensor as input data and determine an output that characterizes an activation signal for an air-conditioning unit. The output can then be used to control the air-conditioning unit accordingly.

To determine the output, the classifier uses weights that it comprises. The weights can be understood as representing the specific function that the classifier uses to determine the output from the input data point submitted to it.

In particular, the weights can be arranged in successive layers, for example, if the classifier comprises a neural network and the neural network comprises the weights. For example, a layer can receive the input data point or an output of a layer, layer output, of the classifier as input. Depending on the input and the weights contained in the layer, the layer can then in turn determine a layer output, for example, according to the formula $$s = W \cdot i$$

where s is the layer output, W is a matrix of the layer weights, and i is the input of the layer. Alternatively, it is also conceivable that the layer performs a discrete convolution, with the layer containing the weights in the form of at least one filter of the discrete convolution.

The layer output of a final layer of the classifier can then be used, for example, as the output of the classifier.

The weights of the classifier can be represented within a computer that operates or trains the classifier in the form of binary numbers, for example according to the IEEE 754 standard as binary floating-point numbers. In order to design the classifier to be more energy-efficient, the resolution of the weights can be reduced. A resolution can be understood to mean a value that characterizes a number of values that are allowed as weights.

This reduction in resolution is commonly also known as quantization. The aim is to reduce the number of possible values required to calculate the output to a small number. For this small number, arithmetic operations such as multiplication or addition can then be implemented very efficiently, via e.g. conversion tables (or lookup tables).

A quantization of the classifier can therefore be understood as the quantization of the weights of the classifier. The effect of a quantization of the classifier is that the classifier can be executed on computing units with a resolution corresponding to the quantization, which generally consume less energy than computing units with a higher resolution.

It is advantageous to incorporate a desired reduced resolution in the training of the classifier, since a retrospective quantization of a classifier which was trained without quantization results in a considerable loss of performance.

Likewise, a classifier which was quantized with a predefined resolution during the training stage should also be operated at the same resolution at the inference stage, i.e. at the time of operation of the fully trained classifier, as otherwise there will also be a significant loss of performance.

For example, an equidistant type of quantization can be selected. An equidistant quantization can be understood as a quantization in which the initial values are an equal distance apart. However, other distances between the initial values are also possible. For example, the distances between the initial values can follow a logarithmic function. Alternatively, it is also possible for the distances between two consecutive initial values to be freely selectable.

The weights can be quantized according to the formula $$q(w) = sgn(w) \cdot \Delta \left\lfloor \frac{abs(w)}{\Delta} + 0.5 \right\rfloor$$

where $\lfloor \bullet \rfloor$ is the rounding function to the next smaller or equal integer, w is a weight to be quantized, $\Delta$ is a value of the quantization known as the step size, sgn is the signum function, and q(w) is the quantized weight. The quantized weights can then be used, for example, to determine a layer output.

Typically, the weight w is set to a value xmin if it is less than the value xmin, or set to a value xmax if it is greater than the value xmax. The interval between xmin and xmax can be determined from the following relationship between the resolution b in bits and the step size $\Delta$:

$$xmax - xmin = \Delta(2^b - 1).$$

Preferably, xmax and xmin can be selected in such a way that the quantization is centered as closely as possible around the value 0. For example, xmax can be selected according to the formula $$xmax = \Delta(2^{b-1} - 1)$$

and then $x$ min according to $$xmin = -\Delta \cdot 2^{b-1}.$$

A quantization type can be characterized by a predefined resolution and a predefined step size. A quantization of the classifier according to the quantization type can then be understood to mean that the classifier is quantized using the resolution and the step size.

In the training procedure, the first number can be understood as the resolution of a quantization type and the second value can be understood as the step size of the quantization type with which the classifier is trained.

It is conceivable that a plurality of the classifier weights will be determined in a pre-training procedure prior to the training and made available to the classifier for the training. For example, it is conceivable for the weights to be determined first without quantization by the pre-training. The term "without quantization" is to be understood here to mean that during training the weights are not quantized to a given resolution, rather the weights are trained according to their original resolution.

In a training procedure following the pre-training, a resolution of a desired quantization type can then be specified while maintaining the weights determined in the pre-training and the distance value can be trained in such a way that the classifier quantized with the quantization type achieves an optimum performance.

The advantage of this approach is that the classifier can quickly determine a suitable second value at different resolutions by the training, since only the second value needs to be adjusted. For the same amount of time available this means that the classifier can be trained with more data, which improves the performance of the classifier.

In addition, the memory required by the classifier weights and the classifier calculations can be advantageously reduced by quantizing the weights and storing the quantized weights.

Alternatively, the weights can also be stored in unquantized form and only quantized at the runtime of the classifier. In the case of a classifier trained using the training procedure described above, this offers the advantage that the classifier can be quantized at different resolutions at the runtime (also the inference stage), while the performance remains satisfactory.

For example, it may be advantageous if a battery-powered system that operates the classifier selects the quantization type depending on the charge state of the battery. When the battery has a high charge level, a quantization type with a high resolution (and thus from the point of view of the classification, consuming more energy) can be used to quantize the classifier, whereas at low charge a quantization type with a low resolution can be selected.

It is also conceivable for the quantization type to be selected depending on the difficulty of the classification task. For example, the difficulty of a classification task can be determined by means of a data set which contains data characterizing the classification task. For example, the performance of the classifier in relation to the data of the data set can characterize the difficulty of the data set.

For example, it is conceivable that object detection of distant and correspondingly small objects is much more difficult than detection of nearby objects. It is reasonable to expect that in the case of distant objects, a high-resolution quantization type must be selected in order to achieve a desired performance. Furthermore, it is conceivable that for a simple classification task, a quantization type of low resolution can already be selected in order to achieve a corresponding desired performance. For example, it is conceivable that a classifier designed to decide whether it is day or night on the basis of image data can achieve a reasonable performance even with a very low-resolution quantization type.

Furthermore, it is conceivable for at least portions of the multiplicity of the classifier weights to be provided on the basis of a pre-training preceding the training procedure.

The weights of the classifier can therefore be determined in the pre-training in such a way that they can be used as the basis for many different quantization types.

Furthermore, it is conceivable that during the pre-training the at least portions of the multiplicity of weights are determined based on a quantization of the at least portions of the multiplicity of weights to a predefined second number of first values.

This embodiment can be understood in such a way that a quantization type of different resolution is used for the pre-training than for the subsequent training. This means that the classifier is provided with a multiplicity of weights that are suitable for a multiplicity of different quantization types. To quantize the classifier to a quantization type from the multiplicity of quantization types, the step size of the desired quantization type can simply be used as the second value.

This has the advantage that the weights of the classifier can be quantized for quantization types of different resolutions, while the performance of the classifier remains adequate despite quantization to different resolutions.

It is also possible for a dataset of input data to be used for training, wherein a desired output exists for at least one input data point, wherein the classifier determines an output for the input data point and the distance value is then adjusted based on a difference between the determined output and the desired output.

Furthermore, it is possible to determine the desired output by means of the classifier and on the basis of the weights determined during the pre-training.

The advantage of this embodiment is that the desired output does not have to be determined manually, but can be determined automatically by the classifier using the weights determined during the pre-training. This automated approach is able to determine a multiplicity of desired outputs in a much shorter time than would be possible manually. In this way, a much larger data set can be determined for training the classifier. Using this larger data set allows the classifier to be trained with more data, which further increases the performance.

BRIEF DESCRIPTION OF THE DRAWINGS

In the following, embodiments of the disclosure are described in more detail by reference to the accompanying drawings. In the drawings.

DETAILED DESCRIPTION

Figure 1:
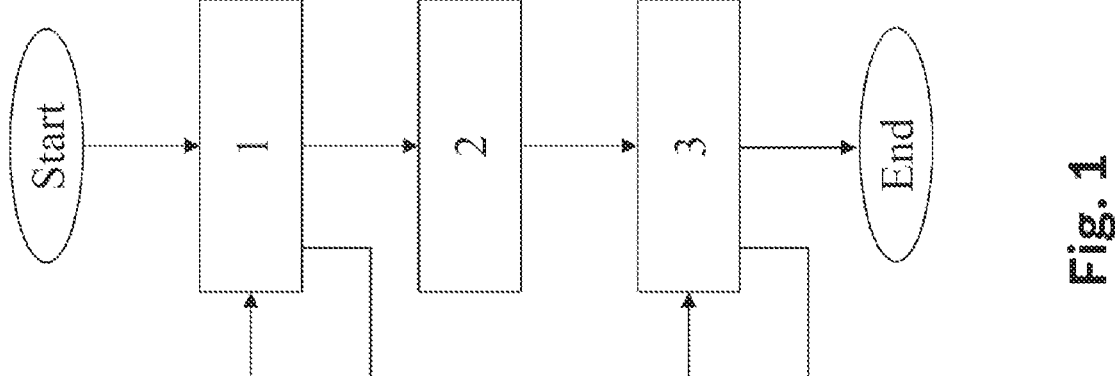
FIG. 1 shows a schematic diagram of a method for training a classifier in the form of a flow diagram.

FIG. 1 shows a flow diagram for a method for training a classifier. In the exemplary embodiment, the classifier is provided by a neural network. The neural network comprises weights arranged in layers.

In a first step (1), the neural network is trained by adjusting the weights of the neural network. In the exemplary embodiment a gradient descent method is used for adjusting the weights. The weights used in the exemplary embodiment are binary floating-point numbers in IEEE 754 format.

To determine a multiplicity of gradients required for the gradient descent method, a multiplicity of input data from a first training data set is fed to the neural network, wherein for each input data point, a desired output exists that corresponds to the input data point. The neural network determines one output for the input data in each case. To determine the output, the respective arithmetic operations are quantized according to a predefined first quantization type. For the exemplary embodiment, a resolution of 8 bits is selected for the first quantization type at this point. In alternative exemplary embodiments, other resolutions can also be chosen.

In the exemplary embodiment, the step size is adjusted during the training to determine a suitable step size for the first quantization type. In alternative exemplary embodiments, it would also be possible to set the step size to a fixed value. In the exemplary embodiment, the same step size is used to quantize each of the weights. In alternative exemplary embodiments it is also possible for different step widths to be used for different weights.

The desired outputs are then compared with the outputs determined by the neural network using a loss function, wherein the loss function determines a loss value which characterizes a deviation of the determined outputs from the desired outputs. In particular, a negative log-likelihood function can be used as the loss function here. Based on the loss function, a multiplicity of gradients is then determined with respect to the multiplicity of weights and the loss value, and the weights are adjusted according to their negative gradient. A gradient of the step size is also determined with respect to the loss function and the step size is adjusted according to the negative gradient.

To determine the gradients, a so-called backward pass of the loss value is carried out by the neural network. The weights of the neural network are not quantized during the backward pass. The weights of the neural network in the exemplary embodiment are stored in the IEEE 754 format during the training.

In alternative exemplary embodiments the first step (1) is repeated iteratively until a predefined number of iterations has been reached or the determined loss value is below a specified threshold value. In each iteration, a new multiplicity of input data can be determined randomly from the training data set and used to train the neural network. Alternatively, the weights can also be determined based on the gradients of all training data.

In a second step (2), the neural network trained in the first step (1) is then used to determine an output for each of a multiplicity of input data of a second training data set. The output determined for an input data point is provided as the desired output for the input data point in the training data set. In alternative exemplary embodiments, it is also possible for the desired output to be determined manually instead of by the neural network.

In a third step (3), the neural network is adjusted so that it can achieve an adequate performance for a second quantization type. For the exemplary embodiment, a resolution of 4 bits is chosen for the second quantization type. In alternative exemplary embodiments, however, other resolutions can also be selected at this point. For the training in the third step (3), the neural network uses the weights determined in the first step (1). For the training in the third step (3) the weights are not adjusted, while a second step size of the second quantization type is determined in such a way that the best possible performance using the second quantization type is achieved with respect to the second training data set determined in the second step.

For this purpose, a multiplicity of input data and a multiplicity of desired outputs of the second training data set corresponding to the input data are provided to the neural network. The neural network then determines a multiplicity of outputs for the multiplicity of input data, wherein the outputs are determined by quantizing each of the weights according to the second quantization type.

A loss function is then used to determine a loss value which characterizes a difference between the multiplicity of the desired outputs and the multiplicity of the determined outputs. The same loss function that was used in the first step (1) can be used as the loss function here. Then a gradient of the second step size is determined with respect to the loss value and the second step size is adjusted according to the negative gradient.

In alternative exemplary embodiments the first step (3) is repeated iteratively until a predefined number of iterations has been reached or the determined loss value is below a specified threshold value. In each iteration, a new multiplicity of input data can be determined randomly from the second training data set and used to train the neural network. Alternatively, the weights can also be determined based on the gradients of all training data.

After the training, the trained neural network and the second step size are provided as a result of the training, after which the training procedure terminates.

Figure 2:
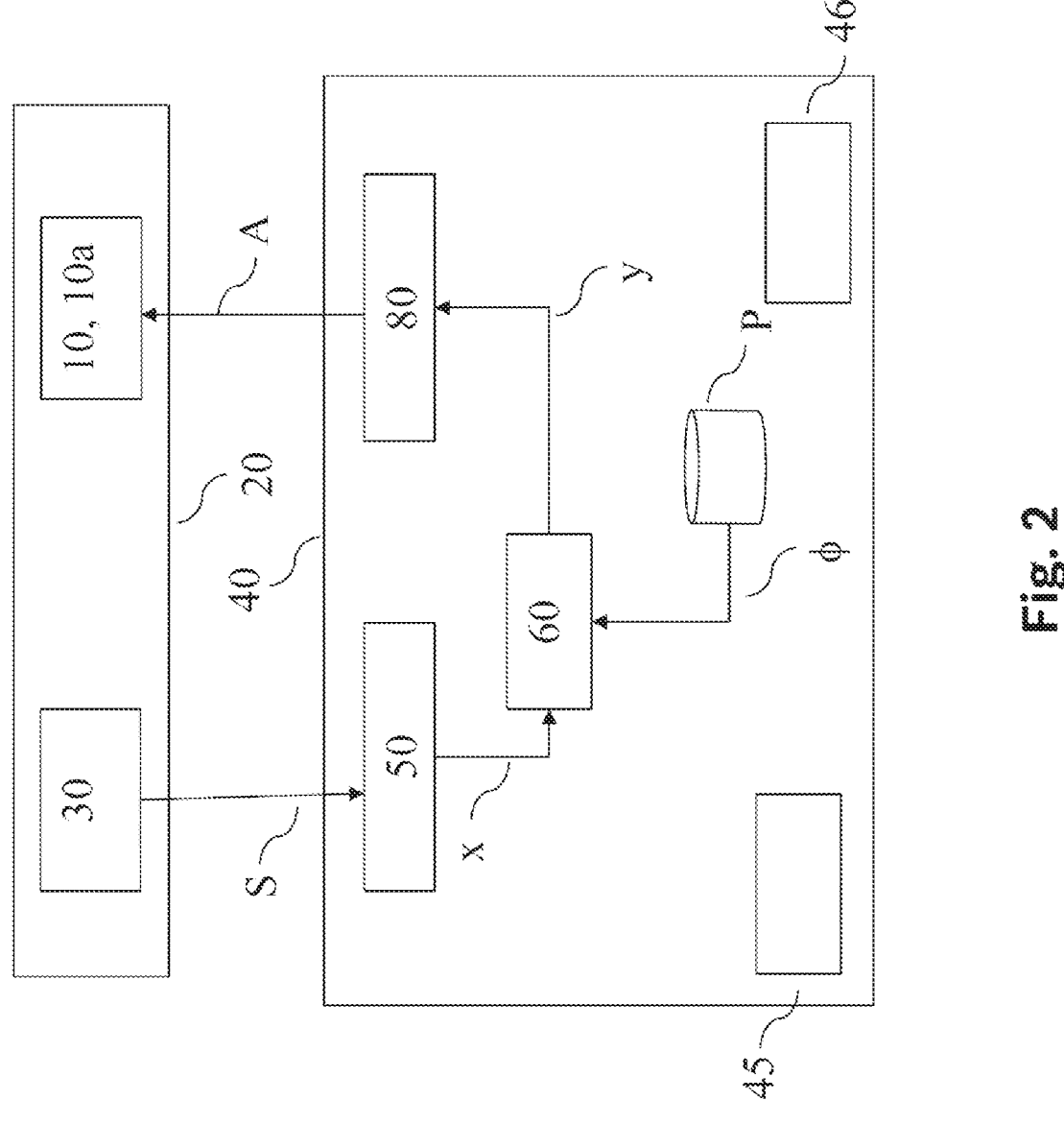
FIG. 2 shows a schematic diagram of a structure of a control system for controlling an actuator.

FIG. 2 shows a control system which uses the classifier (60) described in the exemplary embodiment from FIG. 1 to control an actuator (10) in an environment (20). At preferably regular intervals, the environment (20) is captured in a sensor (30), in particular an imaging sensor such as a video sensor, which can also be provided by a plurality of sensors, such as a stereo camera. The sensor signal (S)—or in the case of multiple sensors one sensor signal (S) each—of the sensor (30) is submitted to the control system (40). The control system (40) thus receives a sequence of sensor signals (S). The control system (40) uses this to determine activation signals (A) which are transmitted to the actuator (10).

The control system (40) receives the sequence of sensor signals (S) of the sensor (30) in an optional receiver unit (50), which converts the sequence of sensor signals (S) into a sequence of input images (x) (alternatively, the sensor signal (S) can be directly accepted as the input image (x)). The input image (x) can be, for example, an extract or a further processed version of the sensor signal (S). The input image (x) comprises individual frames of a video recording. In other words, the input image (x) is determined depending on the sensor signal (S). The sequence of input images (x) is fed to the classifier (60).

The classifier (60) is preferably parameterized by parameters ($\varphi$) which comprise the weights and the second step size and which are stored in a parameter memory (P) that makes them available.

The classifier (60) calculates outputs (y) from the input images (x), wherein the arithmetic operations required to determine the outputs (y) are quantized on the basis of the second step size and the resolution of the second quantization type. The outputs (y) are fed to an optional conversion unit (80) which determines activation signals (A) from them which are fed to the actuator (10) in order to activate the actuator (10) accordingly. In the exemplary embodiment, the classifier (60) is designed to detect objects in the input images (x) and the output (y) comprises information about objects that the sensor (30) has detected.

The actuator (10) receives the activation signals (A), is activated accordingly and carries out an appropriate actuation. The actuator (10) can comprise a control logic (not necessarily integrated in the structure), which determines a second activation signal from the activation signal (A), with which the actuator (10) is then activated.

In other exemplary embodiments, the control system (40) comprises the sensor (30). In still further exemplary embodiments, the control system (40) alternatively or additionally comprises the actuator (10).

In other preferred embodiments, the control system (40) comprises at least one processor (45) and at least one machine-readable storage medium (46) on which instructions are stored which, when executed on the at least one processor (45), cause the control system (40) to execute the method according to the disclosure.

In alternative embodiments, a display unit (10a) is provided as an alternative or in addition to the actuator (10).

Figure 3:
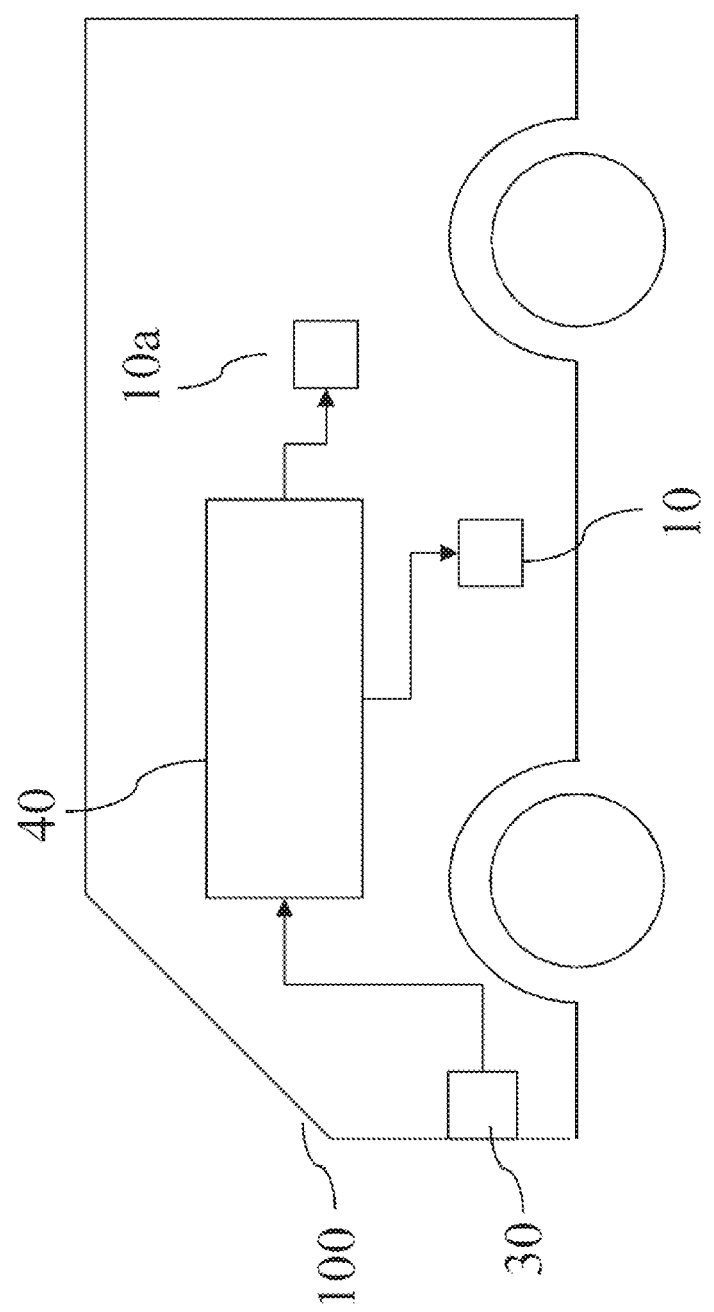
FIG. 3 shows a schematic diagram of an exemplary embodiment for controlling an at least partially autonomous robot.
Figure 3:

FIG. 3 shows how the control system (40) can be used to control an at least partially autonomous robot, here an at least partially autonomous motor vehicle (100).

For example, the sensor (30) can be a video sensor preferably arranged in the motor vehicle (100).

The classifier (60) is configured to identify objects from the input images (x).

The actuator (10), preferably arranged in the motor vehicle (100), can be, for example, a brake, a drive or a steering of the motor vehicle (100). The activation signal (A) can then be determined in such a way that the actuator (10) is controlled in such a way that the motor vehicle (100), for example, prevents a collision with the objects identified by the classifier (60), in particular if these are objects of certain classes, e.g. pedestrians.

Alternatively, the at least partially autonomous robot can also be another mobile robot (not shown), for example one that travels by flying, swimming, diving, or walking. The mobile robot can be, for example, an at least partially autonomous lawn mower or an at least partially autonomous cleaning robot. In these cases, the activation signal (A) can also be determined in such a way that the drive and/or steering of the mobile robot is/are controlled in such a way that the at least partially autonomous robot, for example, prevents a collision with objects identified by the classifier (60).

Alternatively or additionally, the activation signal (A) can be used to control the display unit (10a) and, for example, to display the input images (x) and the objects detected on the input images (x) by the classifier (60). It is also possible, for example, in a motor vehicle (100) with non-automated steering, that the display unit (10a) is controlled with the activation signal (A) in such a way that it emits an optical or acoustic warning signal when it is determined that the motor vehicle (100) is at risk of colliding with one of the reliably identified objects.

Figure 4:
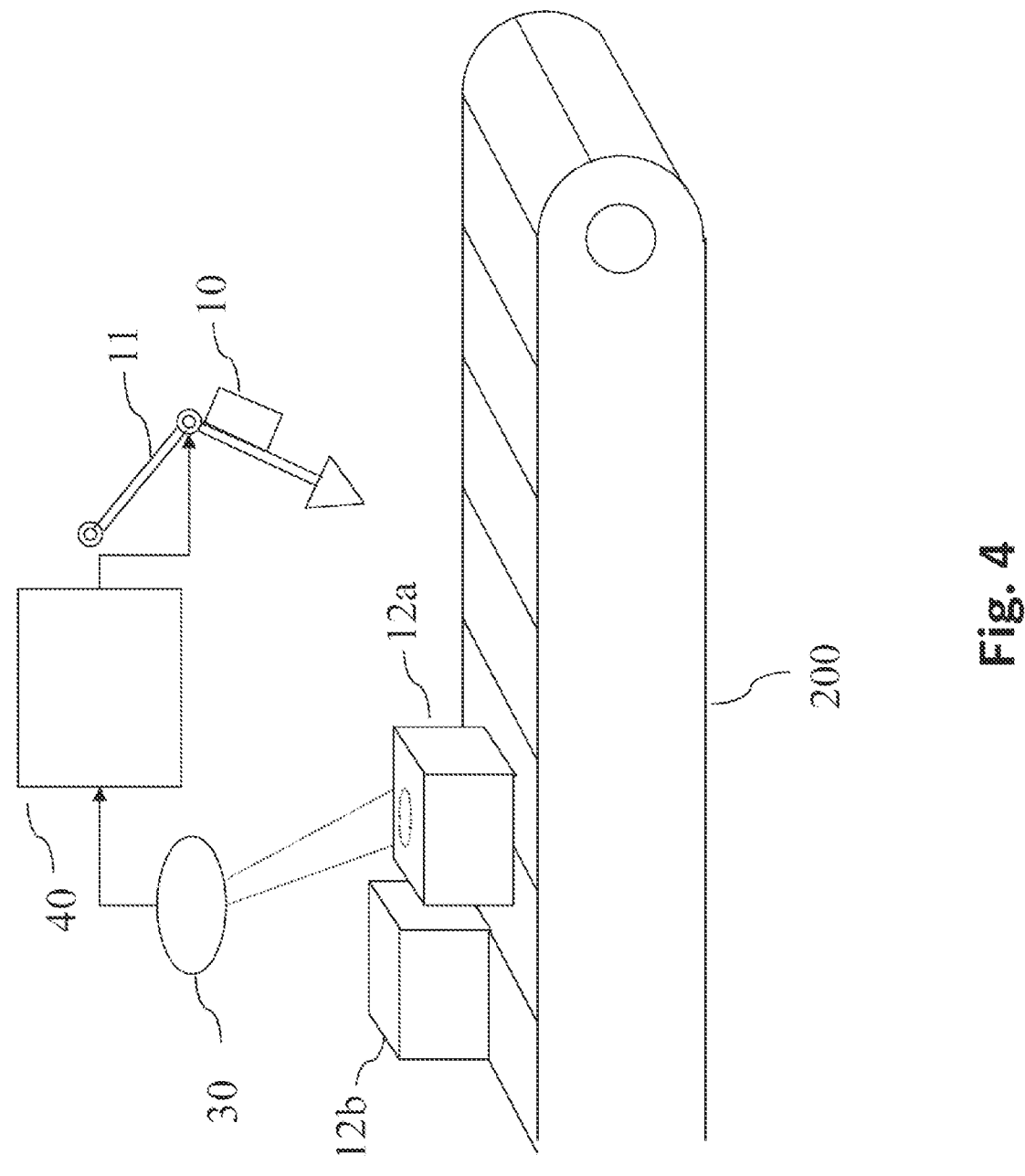
FIG. 4 shows a schematic diagram of an exemplary embodiment for controlling a manufacturing system.

FIG. 4 shows an exemplary embodiment in which the control system (40) is used to control a manufacturing machine (11) of a manufacturing system (200) by controlling an actuator (10) that controls said manufacturing machine (11). For example, the manufacturing machine (11) can be a machine for punching, sawing, drilling and/or cutting.

The sensor (30) can then be an optical sensor, for example, which detects e.g. properties of manufactured products (12a, 12b). It is possible that these manufactured products (12a, 12b) are mobile. It is possible that the actuator (10) controlling the manufacturing machine (11) is controlled depending on a classification of the manufactured products (12a, 12b) detected, so that the manufacturing machine (11) executes a subsequent processing step of the correct manufactured product (12a, 12b) accordingly. It is also possible that by identifying the correct properties of the same manufactured product (12a, 12b) (i.e. without a misclassification), the manufacturing machine (11) adapts the same manufacturing step for processing a subsequent manufactured product accordingly.

Figure 5:
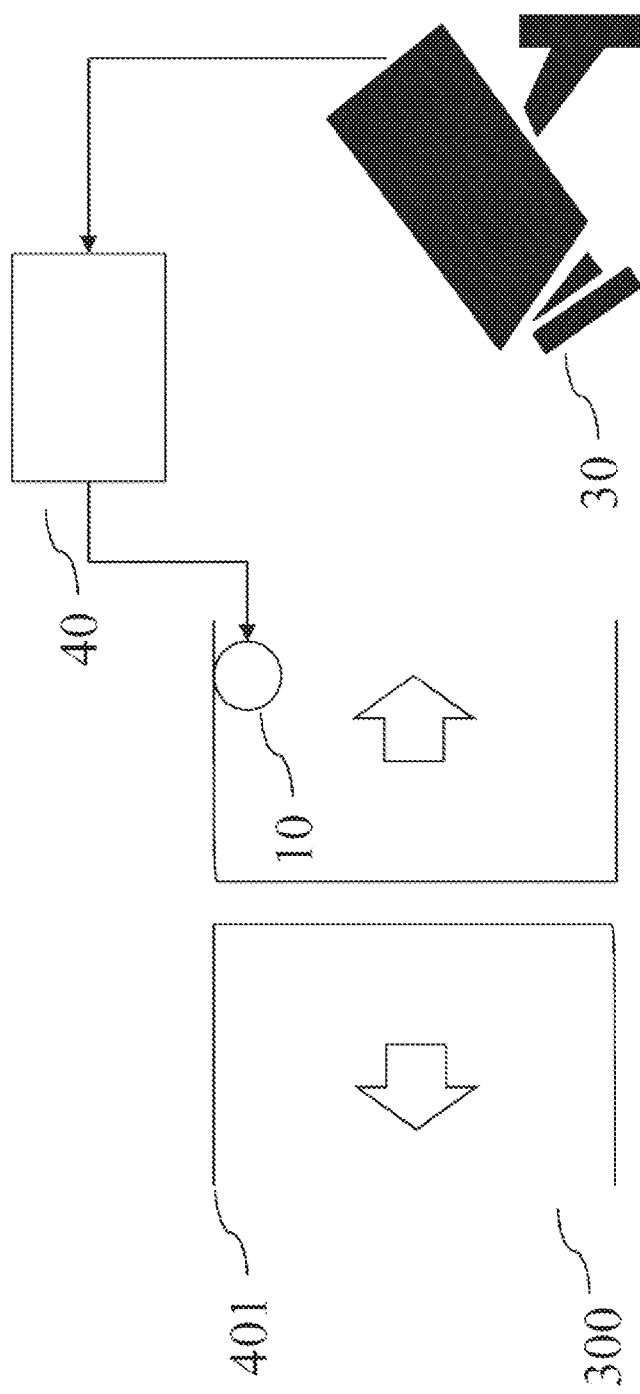
FIG. 5 shows a schematic diagram of an exemplary embodiment for controlling an access system.

FIG. 5 shows an exemplary embodiment in which the control system (40) is used to control an access system (300). The access system (300) can comprise a physical access control system, such as a door (401). The video sensor (30) is configured to detect a person. This captured image can be interpreted using the classifier (60). If multiple persons are detected at the same time, the identity of the persons can be determined with particular reliability by assigning the persons (i.e. the objects) to one another, for example, by analyzing their movements. The actuator (10) can be a lock that enables the access control or not, for example, opens the door (401) or not, depending on the activation signal (A). For this purpose, the activation signal (A) can be selected depending on the object detection of the classifier (60), for example depending on the determined identity of the person. Instead of the physical access control, a logical access control can also be provided.

Figure 6:
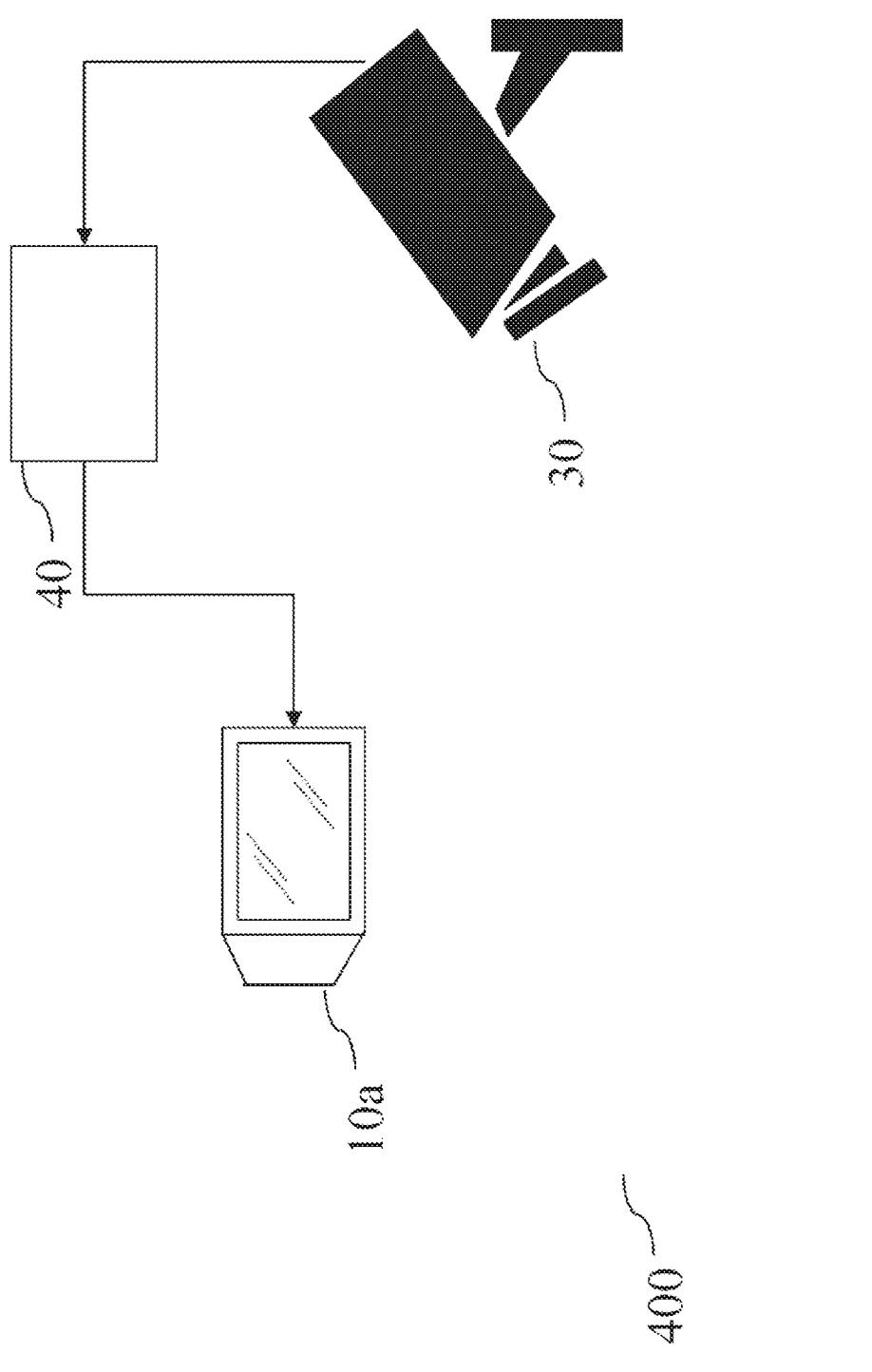
FIG. 6 shows a schematic diagram of an exemplary embodiment for controlling a monitoring system.

FIG. 6 shows an exemplary embodiment in which the control system (40) is used to control a monitoring system (400). This example differs from the exemplary embodiment shown in FIG. 5 in that instead of the actuator (10), the display unit (10a) is provided, which is controlled by the control system (40). For example, the classifier (60) can reliably determine the identity of the objects detected by the video sensor (30), in order to determine from the identities, for example, which ones are suspicious, and the activation signal (A) can then be selected in such a way that this object is highlighted in color by the display unit (10a).

Figure 7:
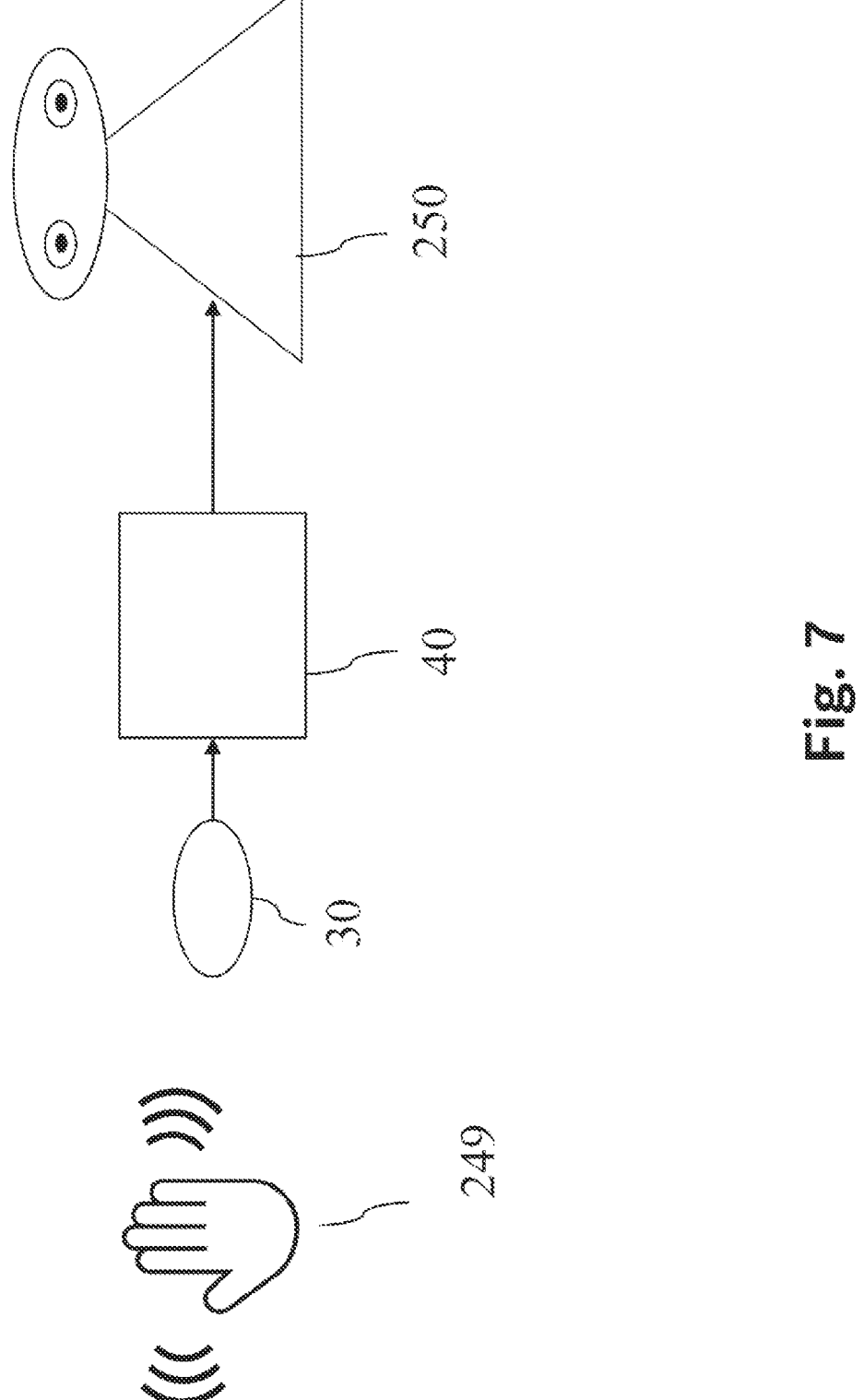
FIG. 7 shows a schematic diagram of an exemplary embodiment for controlling a personal assistant.

FIG. 7 shows an exemplary embodiment in which the control system (40) is used to control a personal assistant (250). The sensor (30) is preferably an optical sensor that receives images of a gesture of a user (249).

Depending on the signals from the sensor (30), the control system (40) determines an activation signal (A) of the personal assistant (250), for example, by the classifier (60) performing a gesture recognition. This determined activation signal (A) is then submitted to the personal assistant (250), and thus activates it accordingly. This determined activation signal (A) can be selected in particular in such a way that it corresponds to a suspected desired activation by the user (249). This suspected desired activation can be determined depending on the gesture recognized by the artificial neural network (60). The control system (40) can then select the activation signal (A) for submission to the personal assistant (250) depending on the suspected desired activation and/or select the activation signal (A) for submission to the personal assistant according to the suspected desired activation (250).

This corresponding activation can include, for example, the personal assistant (250) retrieving information from a database and reproducing it in a form accessible to the user (249).

Instead of the personal assistant (250), a household appliance (not shown), in particular a washing machine, a stove, an oven, a microwave or a dishwasher can also be provided to be controlled accordingly.

Figure 8:
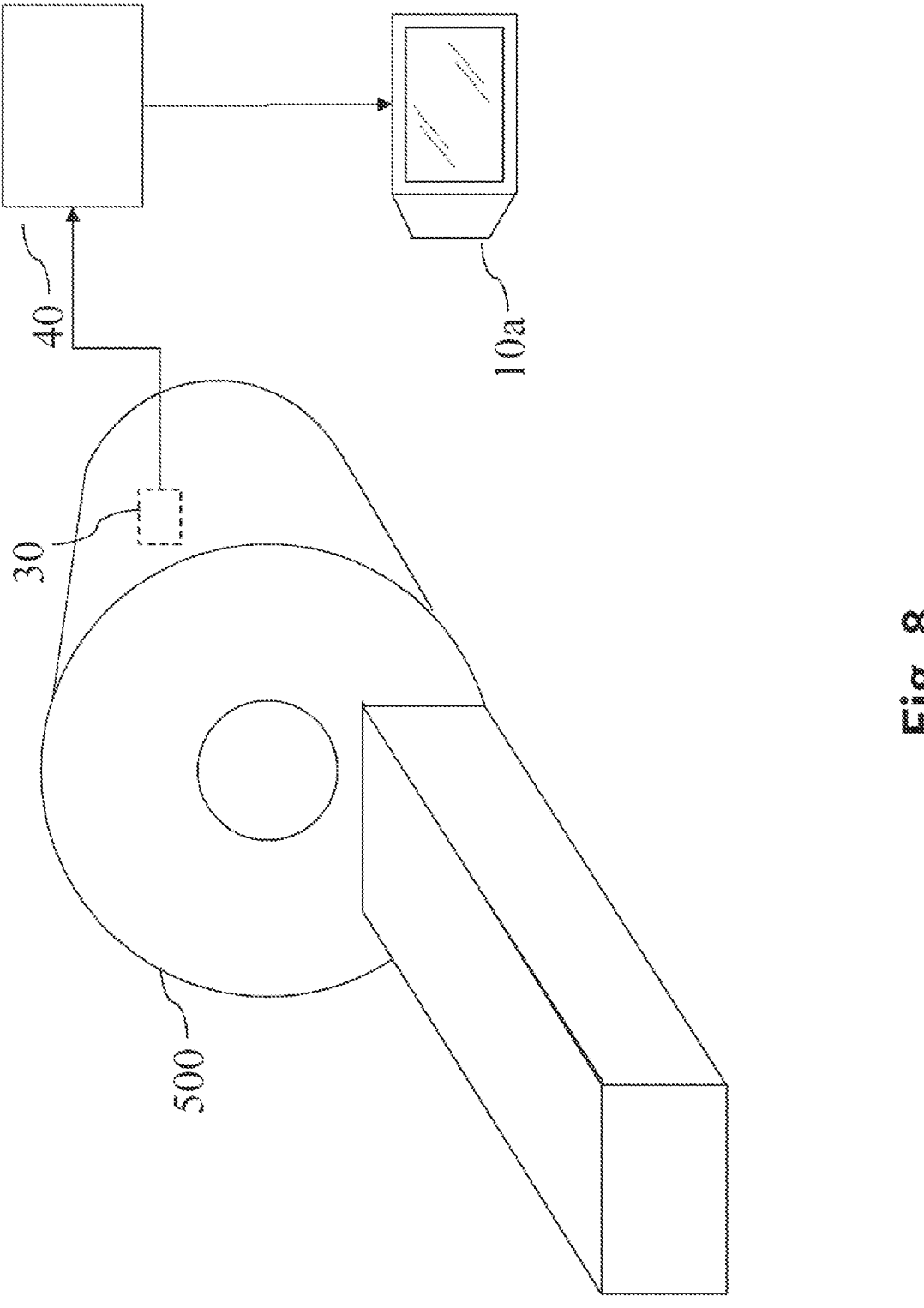
FIG. 8 shows a schematic diagram of an exemplary embodiment for controlling a medical imaging system.

FIG. 8 shows an exemplary embodiment in which the control system (40) is used to control a medical imaging system (500), for example an MRI, X-ray, or ultrasound device. For example, the sensor (30) can be provided by an imaging sensor, while the control system (40) controls the display unit (10a). For example, the classifier (60) can determine whether a region captured by the imaging sensor is abnormal, and the activation signal (A) can then be selected in such a way that this region is highlighted in color by the display unit (10a).

Figure 9:
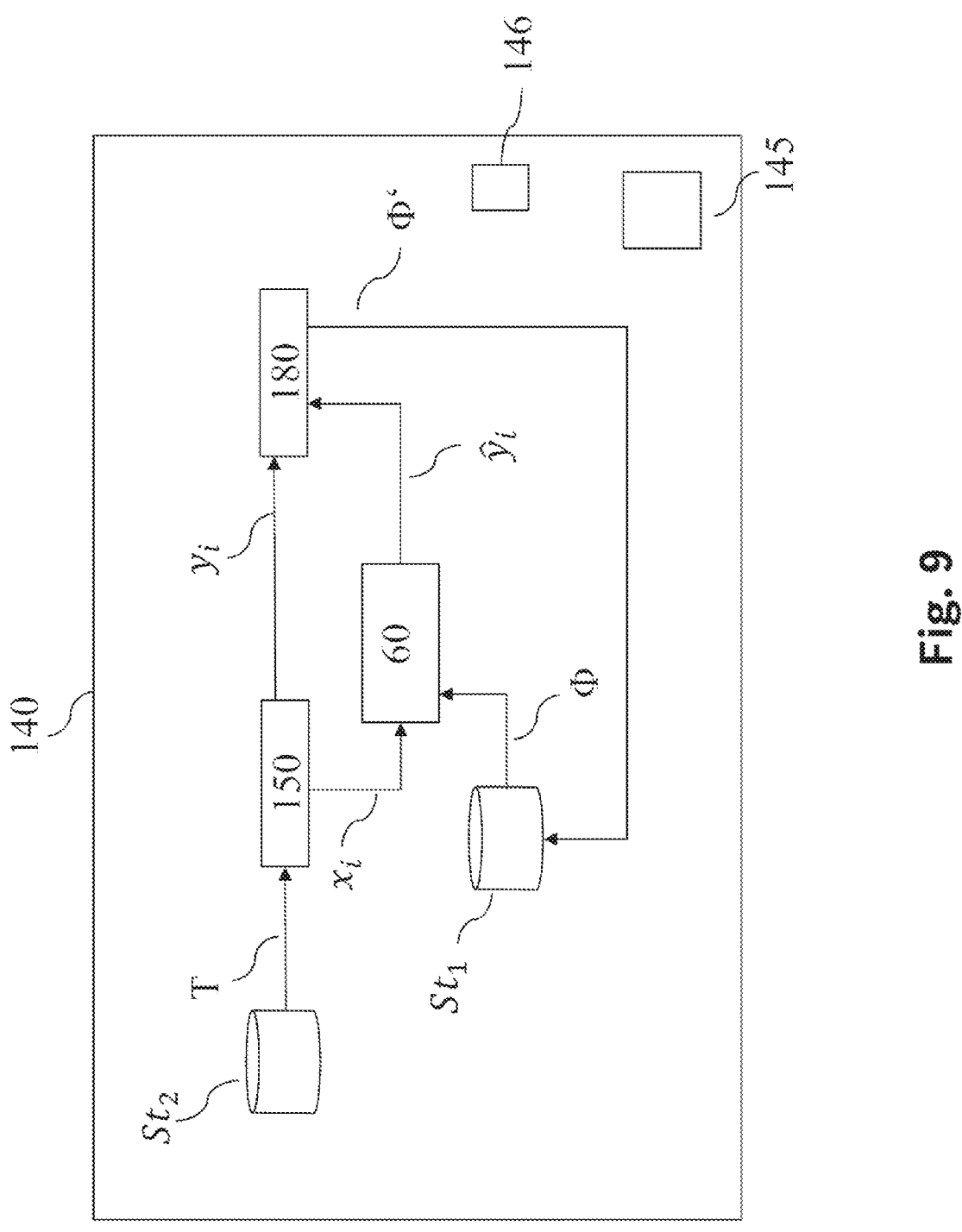
FIG. 9 shows a schematic diagram of a training system for training the classifier.

FIG. 9 shows an exemplary embodiment of a training system (140) which is designed to train the classifier (60), for example according to the method shown in FIG. 1. For the training, a training data unit (150) accesses a computer-implemented database $(St_2)$, wherein the database $(St_2)$ comprises at least one training data set (T) and the training data set (T) comprises a multiplicity of sensor recordings $(x_i)$, wherein for each sensor recording $(x_i)$ a desired output $(y_i)$ is present in the training data set, which corresponds to the sensor recording $(x_i)$.

Parameters (Φ) are provided to the classifier (60) from a model parameter memory $(St_1)$, wherein the parameters (Φ) comprise a multiplicity of weights for the neural network (60) and a step size of a quantization type.

The training data unit (150) determines at least one sensor recording $(x_i)$ and its corresponding desired output $(y_i)$ from the training data set (T) and submits the sensor recording $(x_i)$ to the classifier (60). The classifier (60) calculates an output $(\hat{y}_i)$ on the basis of the sensor recording $(x_i)$, wherein to determine the output $(\hat{y}_i)$ the classifier is quantized by means of a predefined resolution and the step size.

The desired output $(y_i)$ and the determined output $(\hat{y}_i)$ are submitted to a modification unit (180).

Based on the determined output $(\hat{y}_i)$ and the desired output $(y_i)$, the modification unit (180) then determines new parameters (Φ'), wherein the new parameters (Φ') contain the same weights as the original parameters (Φt), and the step size is changed. For this purpose, the modification unit (180) compares the determined output $(\hat{y}_i)$ with the desired output ($y_i$) by means of a loss function. The loss function determines a loss value that characterizes how far the determined output ($\hat{y}_i$) deviates from the desired output ($y_i$).

The modification unit (180) determines the new parameters ($\Phi'$) on the basis of the determined loss value. In the exemplary embodiment, this is carried out by means of a gradient descent method, preferably stochastic gradient descent, or Adam.

The new determined model parameters ($\Phi'$) are stored in the model parameter memory ($St_1$).

In other exemplary embodiments, the described training is repeated iteratively for a predefined number of iteration steps, or repeated iteratively until the measurement falls below a predefined threshold value. In at least one of the iterations, the new parameters ($\Phi'$) determined in a previous iteration are used as parameters ($\Phi$) of the neural network.

Furthermore, the training system (140) can comprise at least one processor (145) and at least one machine-readable storage medium (146) which contains commands which, when executed by the processor (145), cause the training system (140) to execute a training method according to one of the aspects of the disclosure.

The term "computer" covers any device for processing pre-definable calculation rules. These calculation rules can be provided in the form of software or in the form of hardware or in a mixed form of software and hardware.

What is claimed is:

1. A method for training a classifier, the method being computer-implemented, the classifier being configured to determine an output for an input data point based on a multiplicity of weights of the classifier, the output characterizing a classification of the input data point, the method comprising:

pre-training at least a portion of the multiplicity of weights with a second quantization type in which the at least the portion of the multiplicity of weights are quantized with a predefined second quantization resolution and a predefined second quantization step size; and training the classifier by (i) quantizing at least one weight of the multiplicity of weights with a first quantization type in which the at least one weight is quantized with a predefined first quantization resolution and a first quantization step size and (ii) training the classifier by adjusting the first quantization step size without adjusting the multiplicity of weights.

2. The method according to claim 1 further comprising:

storing the multiplicity of weights with the second quantization type, wherein the predefined second quantization resolution is higher than the predefined first quantization resolution.

3. The method according to claim 1, wherein the predefined second quantization resolution differs from the predefined first quantization resolution.

4. The method according to claim 3 further comprising:

determining a respective desired output for a respective input data point using the classifier based on the multiplicity of weights determined during the pre-training.

5. The method according to claim 1, the training further comprising:

determining, with the classifier, a respective output for a respective input data point from a dataset of input data; and adjusting the first quantization step size based on a difference between the determined respective output and a respective desired output for the respective input data point from the dataset of input data.

6. The method according to claim 1, wherein the method is carried out by executing a computer program.

7. A method for operating a classifier, the method being computer-implemented, the classifier being configured to determine an output for an input data point based on a multiplicity of weights of the classifier, the output characterizing a classification of the input data point, the method comprising:

pre-training at least a portion of the multiplicity of weights with a second quantization type in which the at least the portion of the multiplicity of weights are quantized to a predefined second number of values;

training the classifier by (i) quantizing at least one weight of the multiplicity of weights with a first quantization type in which the at least one weight is quantized with a predefined first quantization resolution and a first quantization step size and (ii) training the classifier by adjusting the first quantization step size without adjusting the multiplicity of weights;

determining a first input data point;

selecting a quantization type after the training, the selected quantization type being one of the first quantization type or the second quantization type;

determine a first output for the first input data point using the classifier using the multiplicity of weights with the selected quantization type; and activating at least one of (i) an actuator and (ii) a display device based on the output.

8. A non-transitory machine-readable storage medium configured to store on a computer program for operating a classifier, the classifier being configured to determine an output for an input data point based on a multiplicity of weights of the classifier, the output characterizing a classification of the input data point, the computer program, when executed by a computer, causing the computer to:

receive an input data point;

select a quantization type, the selected quantization type being one of a first quantization type or a second quantization type;

determine an output for the input data point using the classifier using the multiplicity of weights with the selected quantization type; and activate at least one of (i) an actuator and (ii) a display device based on the output, wherein, prior to the selection of the quantization type, at least a portion of the multiplicity of weights were pre-trained with the second quantization type in which the at least the portion of the multiplicity of weights are quantized with a predefined second quantization resolution and a predefined second quantization step size, and wherein, prior to the selection of the quantization type, the classifier was trained by (i) quantizing at least one weight of the multiplicity of weights with a first quantization type in which the at least one weight is quantized with a predefined first quantization resolution and a first quantization step size and (ii) training the classifier by adjusting the first quantization step size without adjusting the multiplicity of weights.

* * * * *